United States Patent [19]

Thomas et al.

[11] 4,429,232

[45] Jan. 31, 1984

[54] APPARATUS FOR GENERATING ELECTRICITY WITHIN A PNEUMATIC WHEEL ASSEMBLY

[76] Inventors: Stephen E. Thomas, 4015 Heron Pl., Fremont, Calif. 94536; Mark S. Thomas, 3770 Flora Vista #403, Santa Clara, Calif. 95051

[21] Appl. No.: 381,191

[22] Filed: May 24, 1982

[51] Int. Cl.³ .................. F21L 13/00; B60C 23/06
[52] U.S. Cl. ............................ 290/1 R; 290/44; 290/55; 200/61.23; 280/11.19; 310/67 R; 324/162; 340/58
[58] Field of Search .................. 290/1 R, 44, 55; 310/67 R, 69, 75 R, 75 C, 162, 329; 340/58; 200/61.23; 280/11.19; 324/161, 162

[56] References Cited

U.S. PATENT DOCUMENTS

| | | | |
|---|---|---|---|
| 3,548,965 | 12/1970 | Pierro | 310/162 X |
| 3,699,367 | 10/1972 | Thomas | 310/69 |
| 3,760,351 | 9/1973 | Thomas | 200/61.23 X |
| 4,117,452 | 9/1978 | Snyder et al. | 200/61.23 X |
| 4,160,234 | 7/1979 | Karbo et al. | 200/61.23 X |
| 4,298,910 | 11/1981 | Price | 280/11.19 X |

Primary Examiner—J. V. Truhe
Assistant Examiner—Terry Flower
Attorney, Agent, or Firm—Paul L. Hickman

[57] ABSTRACT

A generator characterized by a circular track attached to the relieved circumferential surface of a wheel, a carriage coupled to the track by rotary bearings, a generator supported by the carriage, and a clutch wheel coupling an armature of the generator to the track. The track, which preferably has a T shaped cross section, has a driving surface which causes the clutch wheel to rotate when there is relative motion between the track and the carriage and/or between the carriage and the air within the tire.

10 Claims, 5 Drawing Figures

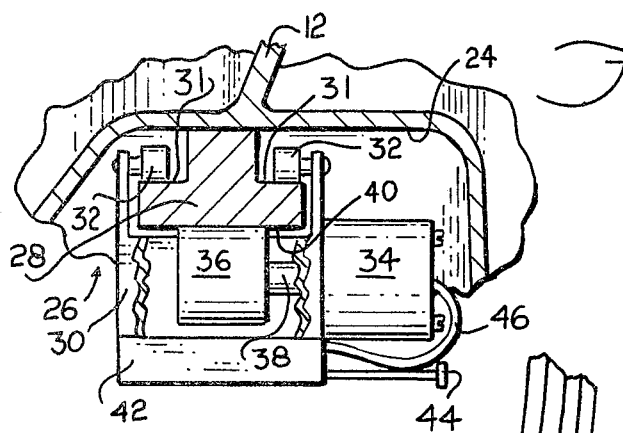
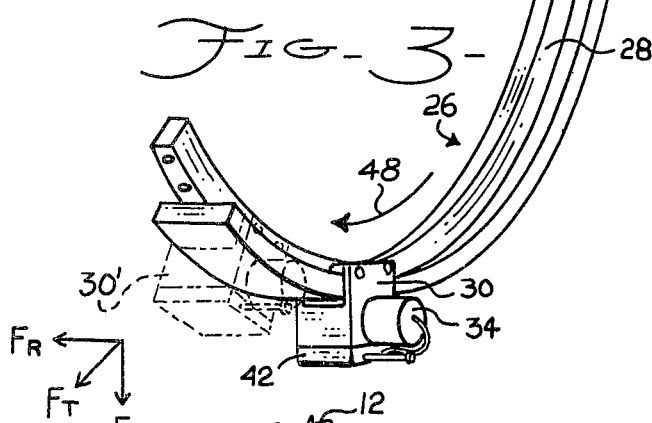
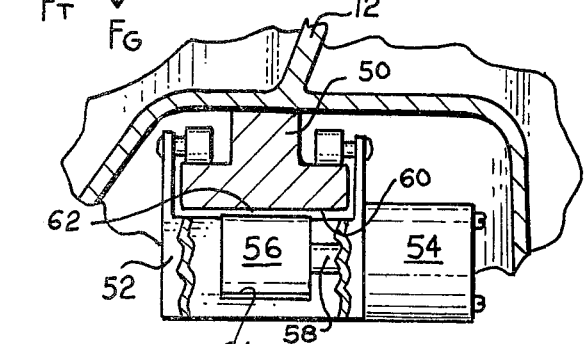
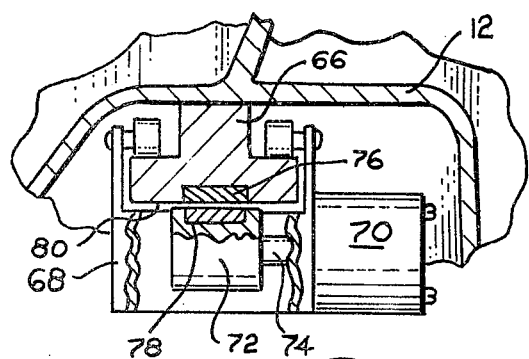
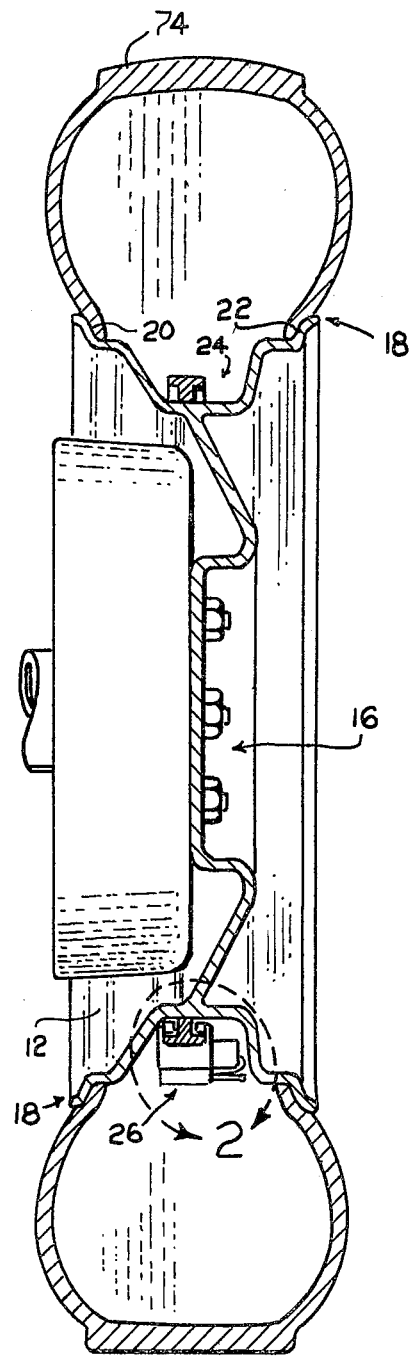

APPARATUS FOR GENERATING ELECTRICITY WITHIN A PNEUMATIC WHEEL ASSEMBLY

BACKGROUND OF THE INVENTION

1. Field of the Invention

This invention relates generally to electrical generators and more particularly to electrical generators located within pneumatic wheel assemblies.

2. Description of the Prior Art

It is sometimes useful to have a source of electricity located within a pneumatic wheel assembly. For example, telemetry units can be placed within a pneumatic wheel assembly to monitor and transmit data including tire pressure, vehicle speed, temperature, flexure, etc. If a vehicle operator places any reliance on a telemetry unit it is imperative that the unit be supplied with a reliable source of electricity.

There are a number of prior art patents which describe electrical generators that can be disposed within a pneumatic wheel assembly. For example, in U.S. Pat. No. 3,699,367 a mechanism for obtaining energy from tire flexure is described that includes a plunger assembly radially attached to a wheel. As the wheel rotates, an end of the plunger is depressed by the normal flexure of the wheel's tire as it comes into ground engagement. The reciprocating motion of the plunger drives a generator. A device operating on similar principles is described in U.S. Pat. No. 3,760,351.

While the above mentioned inventions perform their functions admirably, they both include mechanisms to convert the linear motion of the reciprocating plungers to the rotary motion needed to drive a generator's armature. Such linear-to-rotary converters reduce the overall efficiency of the device and add components that can wear and fail with age.

When a generator of any type rotates with the wheel to which it is attached it is subjected to large centrifugal forces. Furthermore, since a telemetry unit usually rotates with the generator, it too is subjected to large forces.

SUMMARY OF THE INVENTION

An object of this invention is to provide an apparatus for generating electricity within a pneumatic wheel assembly where the generator is not subjected to large centrifugal forces.

Another object of this invention is to provide such an apparatus which further is of a simple, efficient design.

Briefly, the apparatus of the invention includes: a circular track attached to the relieved circumferential surface of a wheel; a carriage coupled to the track; a generator supported by the carriage; and a clutch wheel coupling an armature of the generator to the track. The track, which preferably has a T shaped cross section, has a driving surface which causes the clutch wheel to rotate when there is relative motion between the track and the carriage.

An advantage of this invention is that the generator is only subjected to normal gravitational forces, even when the wheel is rapidly rotating.

Another advantage of this invention is that the armature of the generator is driven directly by forces associated with normal wheel rotation without the need for linear-to-rotary converters.

Yet another advantage of this invention is that a telemetry unit can be attached to the carriage such that it is also protected from centrifugal forces.

A still further advantage of this invention is its non-complex design which minimizes wear and maximizes reliability.

A further advantage of this invention is that the generator and telemetry unit are protected from the outside environment.

These and other objects and advantages of the present invention will no doubt become apparent upon a reading of the following descriptions and a study of the several figures of the drawing.

BRIEF DESCRIPTION OF THE DRAWING

FIG. 1 is a cross sectional view through a pneumatic tire assembly showing the apparatus of the present invention installed within it.

FIG. 2 is an enlarged view of the portion of FIG. 1 encircled by line 2.

FIG. 3 is a partial perspective view of the apparatus.

FIG. 4 is a view comparable to that of FIG. 2 showing an alternative construction for the present invention.

FIG. 5 is a view comparable to that of FIG. 2 showing another alternative construction for the present invention.

DETAILED DESCRIPTION OF THE PREFERRED EMBODIMENT(S)

Referring to FIG. 1, a pneumatic wheel assembly 10 includes a wheel 12 and a tire 14 mounted on the wheel. Wheel 12 is a unitary structure including a hub portion 16 and a rim portion 18 comprising a pair of rim lips 20 and 22 flanking a relieved circumferential surface 24. The apparatus 26 of this invention is attached to the relieved surface 24 and is protected against damage in under run-flat conditions by rim lips 20 and 22.

With additional reference to FIG. 2, the apparatus 26 includes a circular track 28 of T shaped cross section rigidly attached to surface 24, a carriage 30 supported by low friction bearings 32 on a pair of inner race surfaces 31 of track 28, a generator 34 attached to the carriage, and a clutch wheel 36 attached to an armature 38 of the generator. The clutch wheel 36 frictionally engages a driving surface 40 of track 28.

A telemetry unit 42 having a transmission antenna 44 can be optionally attached to carriage 30. The telemetry unit is powered by output wires 46 of the generator and can be of any design well known to those skilled in the art.

In FIG. 3, the apparatus 26 is shown removed from the wheel assembly 10 for the purpose of the following discussion. When wheel 12 and track 28 are not rotating, gravitational force $F_g$ will cause carriage 30 to seek the lowest point of the track. As the wheel and track begin to rotate as suggested by arrow 48, carriage 30 is subjected to an additional force $F_r$ which causes the carriage to move to a new location 30'. $F_r$ is the sum of the the bearing friction $F_b$, and the clutch friction $F_c$. The clutch friction is the sum of the back-torque caused by the loading of the generator and the actual friction between the clutch wheel and driving surface 40.

It will be noted that the maximum force exerted on the generator 34 and telemetry unit 42 is $F_t$, which is far less than the centrifugal force that would be exerted on them if the carriage were rotating with the wheel and track. Since $F_r$ can be greatly reduced by providing low friction bearings and by only lightly loading the generator, $F_t$ can be reduced almost to $F_g$. Of course, when the wheel and track are not rotating the generator and telemetry unit are only subjected to $F_g$.

Obviously, apparatus 26 will only generate electricity when there is relative motion between track 28 and carriage 30 to rotate the clutch wheel. The electrical energy 'E' that can be drawn from generator 34 must thus be less than the total of the bearing resistance torque and the generator torque. Under most circumstances this should be no problem, as the power requirements of many telemtry units are quite modest.

For example, a test model of this device generates 65 milliamperes at 10 volts when the wheel is rotating at 15 mph. The generator and telemetry unit rides up the track about 20° to the perpendicular at this power rating.

In FIG. 4, an alternate embodiment of this invention includes a track 50 attached to the wheel 12, a carriage 52 supported by track 50, a generator 54 attached to carriage 52, and a clutch wheel 56 attached to an armature 58 of the generator. Clutch wheel 56 is slightly separated from a driving surface 60 of track 50 to create an air space 62 which provides an air bearing between the driving surface and the clutch wheel. When the airflow through air space 62 exceeds a threshold level the clutch wheel 56 will rotate. Clutch 56 can be provided with aerodynamic ribs 64. Thus, the clutch can be made to rotate by the relative motion of the air within the tire.

In FIG. 5, a second alternate embodiment of the invention also includes a track 66 attached to the wheel 12, a carriage 68 supported by the track, a generator 70 attached to the carriage, and a clutch wheel 72 attached to an armature 74 of generator 70. Attached to or imbedded in track 66 are a number of ferromagnetic members 76, and attached to or imbedded in clutch wheel 72 is at least one ferromagnetic member attracted to or repulsed by ferromagnetic members 76. The ferromagnetic members 76 are attached to the track in a pattern such that a magnetic field produced by or impinging on members 76 varies along the driving surface of the track. Thus, in this embodiment, there is a magnetic coupling between the clutch wheel and the track which causes the clutch wheel 72 to rotate when there is relative motion between the track 66 and the carriage 68.

The method of this invention includes the steps of forming a circular track around a wheel, coupling a carriage to the track, attaching a generator to the carriage, and coupling an armature of the generator to a driving surface of the track, such that relative motion between the carriage and the track causes the armature to rotate.

While this invention has been described in terms of a few preferred embodiments, it is contemplated that persons reading the preceding descriptions and studying the drawing will realize various alterations, permutations and modifications thereof. For example, a wheel manufacturer could design the present system as part of their O.E.M. product.

It is therefore intended that the following appended claims be interpreted as including all such alterations, permutations and modifications as fall within the true spirit and scope of the present invention.

What is claimed is:

1. An apparatus for generating electricity within a pneumatic wheel assembly including a wheel having a relieved circumferential surface, and a tire mounted on said wheel, said apparatus comprising: a circular track attached to said relieved circumferential surface; a carriage coupled to said track; a generator supported by said carriage; and clutch means coupling said generator to said track.

2. An apparatus as recited in claim 1 wherein said clutch means includes a clutch wheel attached to an armature of said generator in proximity to a driving surface of said track.

3. An apparatus as recited in claim 2 wherein said clutch wheel is adapted to frictionally engage said track.

4. An apparatus as recited in claim 3 wherein said said clutch wheel is operationally disposed proximate said track, whereby airflow above a threshold level between said clutch wheel and said track causes said clutch wheel to rotate.

5. An apparatus as recited in claim 4 wherein said clutch wheel is provided with aerodynamic ribs such that said clutch wheel may be driven by the relative motion of the air within said tire.

6. An apparatus as recited in claim 2 wherein said clutch means further comprises magnetic coupling means between said clutch wheel and said track such that relative motion between said track and said clutch wheel causes said clutch wheel to rotate.

7. An apparatus as recited in claim 6 wherein said magnetic coupling means includes a pattern of ferromagnetic materials attached to said track, and a ferromagnetic material attached to said clutch wheel.

8. An apparatus as recited in claim 2 wherein said carriage is supported by low friction bearings such that the combination of bearing resistance force and clutch resistance force is less than the gravitational force exerted on the mass of the apparatus.

9. An apparatus as recited in claim 7 wherein said track has a T shaped cross section having a pair of inner race surfaces for said low friction bearings, and an outer surface comprising said driving surface.

10. An apparatus as recited in claim 1 further comprising a telemetry unit attached to said carriage.

* * * * *